United States Patent [19]

Bake et al.

[11] 4,051,866

[45] Oct. 4, 1977

[54] VALVE POSITIONING HANDLE

[75] Inventors: Earl A. Bake, Pittsburgh; E. Frederick Schoeneweis, Coraopolis, both of Pa.

[73] Assignee: Rockwell International Corporation, Pittsburgh, Pa.

[21] Appl. No.: 730,929

[22] Filed: Oct. 8, 1976

Related U.S. Application Data

[63] Continuation of Ser. No. 636,844, Dec. 2, 1975, abandoned.

[51] Int. Cl.² ............................................. F16K 5/04
[52] U.S. Cl. ................................ 137/556.3; 137/797; 251/288; 251/309
[58] Field of Search ............... 137/556.3, 797; 251/79, 251/288, 292, 293, 309

[56] References Cited

U.S. PATENT DOCUMENTS

| | | |
|---|---|---|
| 1,936,301 | 11/1933 | Hansen et al. ................... 137/797 X |
| 2,843,152 | 7/1958 | Laird et al. ......................... 137/797 |
| 3,540,481 | 11/1970 | Peters ................................. 137/797 |
| 4,003,403 | 1/1977 | Nehring ......................... 251/309 X |

Primary Examiner—Alan Cohan
Assistant Examiner—Gerald A. Michalsky

[57] ABSTRACT

A valve positioning handle is for a plastic valve which is capable of being utilized in gas distribution pipes and includes a body and a fluid isolation member rotatably disposed therein. If the valve becomes jammed, it and/or the pipe are capable of being destroyed by the application of excessive forces to the isolating member and the body during rotation. The valve positioning handle includes an extended fitting centrally aligned with the isolation member and has a number of working surfaces thereon for the receipt of different torque applying tools. A connecting section between the extended fitting and the isolation member is designed to fail prior to the generation of any excessive forces which might destroy the valve or pipe by a tool being utilized to rotate the fitting.

13 Claims, 4 Drawing Figures

VALVE POSITIONING HANDLE

This is a continuation of application Ser. No. 636,844, filed Dec. 2, 1975, now abandoned.

BACKGROUND OF THE INVENTION

1. Field of the Invention

This invention relates to a valve positioning handle and, more specifically, to such a handle which is designed to prevent the application of excessive forces to the valve during valve positioning which might cause damage or destruction to thevalve or the piping in which it is installed.

2. Description of the Prior Art

There is an increasing demand for plastic valves to be utilized in association with plastic pipe in the gas distribution field. It is of continuing concern that these valves be designed to ensure that the system integrity will be maintained under adverse operating conditions. Federal operating standards, for example, require plastic pipe to be able to withstand pressures up to about 100 p.s.i. under operating temperatures ranging from 20° F to +100° F. Valves utilized with this pipe should satisfy similar requirements. Throughout this range of temperatures and pressures there is created a change in the characteristics of the plastic which complicates the basic problem of system reliability.

Specifically, it has been recognized that if the valve became jammed during efforts to open or close it, a situation could develop whereby a loss of system integrity might follow. Customarily, these valves are located underground and are operated by field service personnel with a variety of metal, torque applying tools. It is felt that if a valve became jammed, these rugged tools could be utilized to apply an excessive force to the isolation member and the body which could destroy the plastic valve or pipe. A crack or fracture in the isolation member, body or pipe could allow an uncontrolled escape of gas which would endanger personnel and property in the area.

SUMMARY OF THE INVENTION

It is therefore an object of this invention to provide a valve positioning handle which can be operated by a tool without allowing the application of an excessive rotational force thereby which could destroy the integrity of the valve or pipe.

It is another object of this invention to provide a valve positioning handle of the type described which can be inexpensively provided for reliable valve operation under normal conditions.

It is still another object of this invention to provide a valve positioning handle which can accommodate a number or torque applying tools commonly utilized for valve operation in the gas distribution field.

To accomplish these and other objects of the present invention, a preferred embodiment includes a valve positioning handle for a plastic valve which is capable of being utilized in a pressurized fluid distribution pipe, has a central axis and includes a body and a fluid isolation means disposed therein for rotation about the axis. The valve and distribution pipe are capable of being destroyed or damaged by the application of excessive forces to the isolation means and the body during rotation. The valve positioning handle includes an extended fitting centrally aligned with the axis and having working surfaces thereon for the receipt of either of a pair of commonly used torque applying tools. A connecting section between the extended fitting and the isolation means is formed of a preselected material and has predetermined cross-sectional dimensions relative to the axis in a plane perpendicular to the axis to ensure its failure prior to the generation of the excessive forces by the tool being utilized to rotate the extended fitting.

DETAILED DESCRIPTION OF THE DRAWINGS

Figure 1:
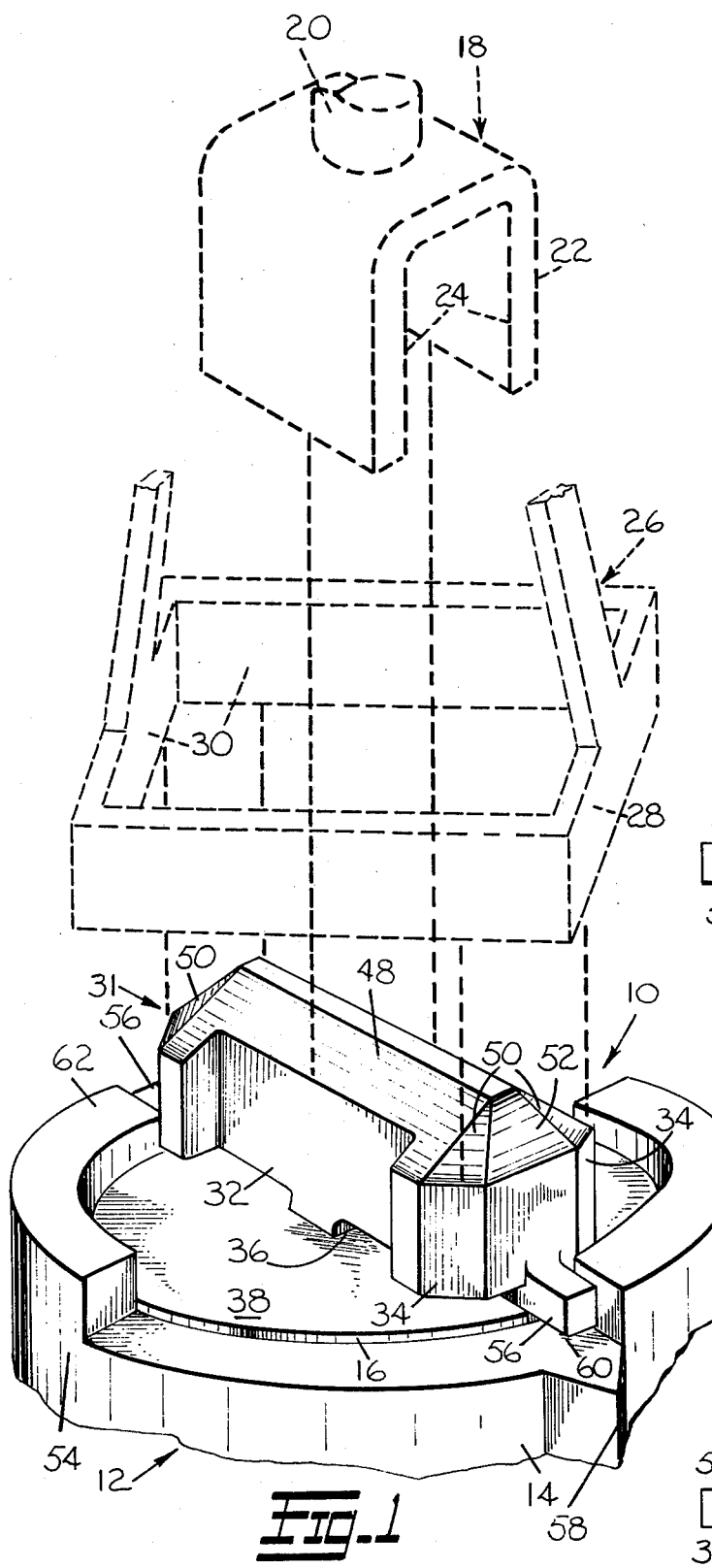
FIG. 1 is a perspective view of the preferred valve positioning handle including various features of the invention.
Figure 3:
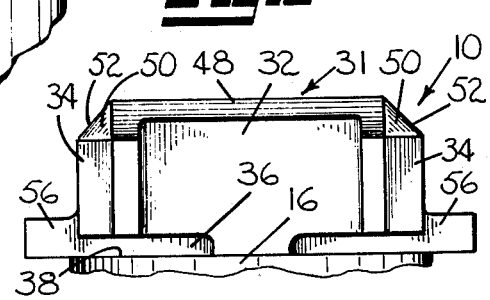
FIG. 3 is a side view of the handle shown in FIG. 1.

As seen in a perspective view in FIG. 1, a preferred valve positioning handle 10 is utilized to open and close a valve 12. The valve 12 includes a body 14 and a fluid isolation member 16 which is disposed within the body 14 for rotation about a central axis of the valve 12. The valve 12 is preferably formed of a plastic material and is of the type which can be utilized in a pressurized gas distribution piping (not shown) which is commonly located underground and subjected to varying environmental conditions.

Also shown in FIG. 1 in phantom are two torque applying tools most often utilized by field service personnel in the operation of isolation valves in this type of system. A first tool 18 is formed of heavy metal and typically includes a T handle (not shown) connected to an extended shaft 20. An inverted U-shaped wrench 22 is centrally aligned with the shaft 20 to include a parallel pair of depending, separated leg planes 24. The leg planes 24 are to be positioned at opposite working sides of a valve operating handle to enable the service personnel to rotate the tool 18 for selective positioning of a valve. A second tool 26 is also formed of metal and includes an operating shaft (not shown) which terminates at a square-shaped wrench 28 at its lower end. The square-shaped wrench 28 has four side planes 30 of equal length, usually two inches, to be positioned about a matching square valve fitting for rotation of the valve isolation member. The tools 18 and 26 have heretofore been used on valves having different operating fittings according to size and/or manufacturer's design but are both quite commonly used in the gas distribution field.

As seen in FIGS. 1 through 4, the preferred valve positioning handle 10 includes an extended fitting 31 which is adapted to selectively accommodate both torque applying tools 18 and 26. The extended fitting 31 is provided a plurality of working surfaces which are generally parallel with the valve axis and specifically includes a pair of opposed surfaces 32 against which each leg plane 24 can be located to rotation by the first tool 18. Other working surfaces include a quadruplet of surfaces 34 which are properly spaced and oriented to respectively receive thereby each side plane 30 of the second tool 26 should it be utilized for valve operation.

As discussed hereinabove, it is of concern that while the heavy, metal tools 18 and 26 are capable of properly positioning a valve, they are structurally capable of being used to generate an excessive force during rotation which could destroy a plastic valve or the plastic distribution piping extending at either side thereof. This would be equally true if some other rugged torque applying tool, such as one with an adjustable wrench fitting, were alternatively employed.

Accordingly, the preferred handle 10 includes a connecting section 36 between the extended fitting 31 and the end 38 of the isolation member 16 on which the handle 10 is mounted. The connecting section 36 is designed to fail under torsional stress before the tool could be utilized on the extended fitting 31 to generate the undesired excessive force within the valve 12 or the pipe. It is known that the maximum torque about a given axis which a section can withstand is a function of the material and the cross-sectional dimensions of the section relative the axis in a plane which is perpendicular to the axis. For a pre-selected material, the ultimate shear stress can be obtained from an engineering material handbook. When the cross-sectional dimensions relative to the axis are predetermined, the polar moment of inertia and the distance from the axis to the most extreme portion of the section (the point at which shearing will begin) can be determined. The ultimate shear stress, the polar moment of inertia and this distance are used to calculate the maximum torque which the section can withstand.

Figure 4:
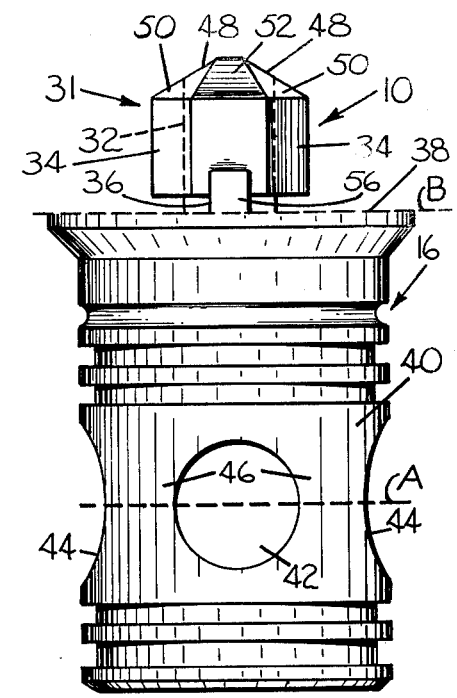
FIG. 4 is an end view of the handle shown in FIG. 1, including, for example, one type of isolation member on which it may be mounted.
Figure 2:
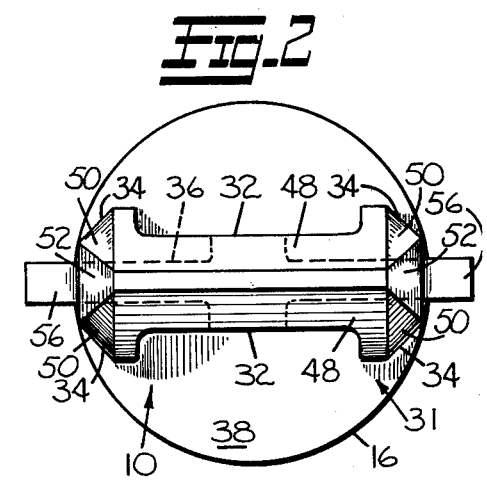
FIG. 2 is a top view of the handle shown in FIG. 1.

By way of example, a typical valve configuration might include an isolation member 14 in the form of a plastic cylindrical plug 40 as shown in FIG. 4. Preferably, the plug 40 and the handle 10 are integrally formed by molding of the same plastic material. Although not shown in the drawings, it was determined by accepted engineering analysis and calculations that both the body 14 and the piping were stronger than the plug and that neither would, in this configuration, be the first element to fail under an excessive force which might be generated by use of the tool. The plug 40 includes a port 42 which is aligned with the passages in the pipe for flow through the valve 12 when in the opened position. A pair of recesses 44 at opposite sides of the plug 40 respectively receive a pair of resiliently deformable sealing members (not shown since that would offer little resistance to torsional failure of the plug 40) which sealing members are to be aligned with the pipe passages when the valve 12 is closed to prevent fluid flow therethrough. The plug 40 therefore has its smallest cross-sectional area at an intermediate plane A where two separated, structural portions 46 join the opposite ends of the plug 40 and would fail in this region if subjected to an excessive torque. The portion of the connecting section 36 at which shearing should first occur under torsional stress is shown in FIG. 4 at plane B.

Mathematical shearing analysis was conducted for a plug and handle configuration formed of plastic material having at least an ultimate shear stress of approximately 20,000 p.s.i. throughout the expected operating temperatures. The plug 40 had a diameter of about two inches and the connection section 36 had a length of about 2.35 inches and an effective width of about 0.25 inches. The results of the analysis indicated that the connecting section 36 would shear at plane B with a torque of about 76 foot-pounds but that 128 foot-pounds torque would be required to shear the plug along plane A where the reduced cross section is located. Laboratory tests were then conducted on such a plug and handle and it was found that the average torque required to break the connecting section was about 80 foot-pounds while about 200 foot-pounds were required for the plug 40 in the region of the port 42.

While the analysis and tests above were conducted for a configuration which exemplifies the purpose of the invention, it should be apparent that a connecting section of different shape or material might be utilized to protect any number of valve configurations. For example, the valve might be a ball valve, or the valve body might be the weakest element, or the isolation member might be formed of a different plastic material from the handle, or the connecting section might be mechanically rather than integrally joined to the isolation member. One skilled in the valve manufacture and construction art should be capable of analyzing the particular configuration to ensure that the connecting section would fail prior to destruction of the valve or pipe.

While breaking the handle, even if valve operation is lost, is obviously preferable to having a dangerous loss of system integrity which would allow the escape of gas, failure of the connecting section 36 is not desired unless needed for this purpose. Unfortunately, designed weakening of the connecting section 36 to ensure failure under excessive torque, leaves it vulnerable to damage by the application of other types of force. Being located underground and being operated by heavy torque applying tools makes the handle particularly susceptible to impact force from any number of sources from above the valve, such as might occur from a dropped tool. The possibility of undesired breakage is increased at lower temperatures as the plastic becomes more brittle. It is therefore desirable to deflect any tool, rock or other object from direct impact on the handle if dropped from above. Therefore, a plurality of facets 48, 50 and 52 are located at the top of the extended fitting 31 and are downwardly inclined from the valve axis for this purpose. Since an impact force might be created by field service personnel striking the handle 10 with a tool when it is not properly aligned with the working surfaces, the facets 48 and 50 are respectively aligned with the working surfaces 32 and 34 to facilitate alignment and decrease the likelihood of damage by this occurrence.

There are in the preferred valve positioning handle 10 additional features which facilitate reliable valve operation. It is not uncommon for a pair of position stop devices 54 to be provided on the body 14 to ensure the valve is in the proper opened or closed position as desired after rotation. A position indicator is usually mounted on the isolation memberto make contact with the stop device 54. In the preferred handle 10, a pair of position indicating tabs 56 are provided for this purpose and are integrally formed with and extend from the connecting section 36. In FIG. 1, the valve 12 is shown in the opened position as evidenced by the tabs 56 being aligned with flow direction arrows 58 formed on the body 14. It is also desirable, as with the handle 10, to prevent damage to the tabs 56 by a tool being dropped or roughly positioned around the extended fitting 31. Since a blow to the handle 10 or the isolation member 16 might cause a slight, rapid axial movement of the isolation member 16 with respect to the body 14, the tabs 56 are axially separated from the body 14, as at 60, to allow limited axial movement thereof free of contact with the body 14 which could break the tabs 56. Additionally, the tabs 56 are axially lower than the extended upper surface 62 of the position stop devices 54. This positioning insures that when the tool 26 is used, it will make contact with the surfaces 62 rather than with the tabs 56 during valve positioning when the tabs 56 could otherwise be damaged or broken.

While there has been shown and described herein a preferred embodiment of the invention, it will be obvious to those skilled in the art that changes and modifications may be made therein without departing from the invention as claimed. For example, it should be apparent that a handle may now be provided for use on any number or type of valves in the gas distribution field which handle will accommodate both commonly used tools 18 and 26. This type of handle can be advantageous even if it does not include a breakable connecting section and is not primarily intended to protect a plastic valve.

What is claimed is:

1. A valve positioning handle for a plastic valve which is capable of being utilized in a pressurized fluid distribution pipe, has a central axis and includes a body and a fluid isolation means disposed therein for rotation about said axis; at least one of said valve and said distribution pipe being capable of being destroyed or damaged by the application of excessive forces to said isolation means and said body during rotation; said valve positioning handle comprising:
   an extended fitting centrally aligned with said axis and having working surfaces thereon for receipt of at least one type of torque applying tools; and
   a connecting section between said extended fitting and an end of said isolation means being formed of a pre-selected material and having predetermined cross-sectional dimensions relative to said axis in a plane perpendicular to said axis to ensure its failure prior to generation of said excessive forces by said torque applying tool being utilized to rotate said extended fitting.

2. The valve positioning handle as set forth in claim 1, wherein said pre-selected material is plastic and said extended fitting and said connecting section are integrally formed with said end of said isolation means.

3. The valve positioning handle as set forth in claim 1, wherein said body of said valve includes a pair of position stop means, further including a pair of position indicating tabs aligned with said respective stop means during rotation to limit rotation of said isolation means between an opened and a closed position.

4. The valve positioning handle as set forth in claim 3, wherein said position indicating tabs are integrally formed, radial extensions of said connecting section.

5. The valve positioning handle as set forth in claim 4, wherein said body of said valve is axially separated from said position indicating tabs to allow limited axial movement of said isolation means without said body making contact with said position indicating tabs.

6. The valve positioning handle as set forth in claim 3, wherein said position stop means extend axially above said position indicating tabs to protect said position indicating tabs from undesired contact with said torque applying tool during said receipt thereof on said extended fitting.

7. The valve positioning handle as set forth in claim 1, wherein said extended fitting includes a deflection means thereon to minimize the effect of an impact force in a generally axial direction being applied to said valve positioning handle which might result in undesired said failure of said connecting section.

8. The valve positioning handle as set forth in claim 7, wherein said deflection means includes a plurality of facets located at the top of said extended fitting and inclined with respect to said axis.

9. The valve positioning handle as set forth in claim 8, wherein at least one of said plurality of said facets is aligned with each of said working surfaces to facilitate alignment of said torque applying tool with said working surfaces during said receipt of said torque applying tool on said extended fitting.

10. The valve positioning handle as set forth in claim 1, wherein said types of said torque applying tools include an inverted U-shaped wrench having a pair of parallel leg planes and square-shaped wrench having four side planes; and said working surfaces of said extended fitting include a pair of opposed surfaces paralleled with said axis and each other for respectively receiving said parallel leg planes of said inverted U-shaped wrench adjacent thereto and a quadruplet of surfaces each of which parallel with said axis and disposed with respect to each other for respectively receiving one of said side planes of said square-shaped wrench thereby.

11. A valve positioning handle for a valve which valve includes a body member and a rotatable isolation member and is connectable to a distribution pipe member, at least one of said members being formed of plastic having a predetermined ultimate shear stress, said isolation member being disposed within said body member and rotatable about an axis to control the flow of fluid through said pipe member, said one of said members being capable of being destroyed or damaged if said ultimate shear stress is exceeded by the application of excessive forces thereto during rotation of said isolation member, said valve positioning handle comprising: an extended fitting having working surfaces thereon for receipt of at least one type of torque applying tool for rotating said isolation member; and a connecting section extending axially between said extended fitting and said isolation member, being formed of a pre-selected material and having predetermined crosssectional dimensions as measured in a plane which is perpendicular to said axis to insure failure by torsional shear generally along said plane prior to generation of said excessive forces to said one of said members by said torque applying tool.

12. The valve positioning handle recited in claim 11 wherein said one of said members being formed of plastic is said isolation member.

13. The valve positioning handle recited in claim 11 wherein said extended fitting is centrally aligned with said axis.

* * * * *